(12) United States Patent
Stark et al.

(10) Patent No.: US 9,759,565 B2
(45) Date of Patent: Sep. 12, 2017

(54) RADIO FREQUENCY RING LASER GYROSCOPE INCLUDING A MULTIPLE ELECTRODE SYSTEM AND AN IMPEDANCE MATCHING CIRCUIT

(71) Applicant: Honeywell International Inc., Morristown, NJ (US)

(72) Inventors: Terry Dean Stark, St. Louis Park, MN (US); Jason Wiebesick, Golden Valley, MN (US); Travis Edward Christle, Burnsville, MN (US); Douglas R. Carlson, Woodbury, MN (US); Ruth Dagmar Kreichauf, River Falls, WI (US)

(73) Assignee: Honeywell International Inc., Morris Plains, NJ (US)

( * ) Notice: Subject to any disclaimer, the term of this patent is extended or adjusted under 35 U.S.C. 154(b) by 197 days.

(21) Appl. No.: 14/597,971

(22) Filed: Jan. 15, 2015

(65) Prior Publication Data

US 2016/0209213 A1    Jul. 21, 2016

(51) Int. Cl.
*G01N 21/00* (2006.01)
*G01C 19/66* (2006.01)

(52) U.S. Cl.
CPC ........... *G01C 19/661* (2013.01); *G01C 19/66* (2013.01)

(58) Field of Classification Search
CPC .............................. G01C 19/66; G01C 19/661
USPC .......................................................... 356/30
See application file for complete search history.

(56) References Cited

U.S. PATENT DOCUMENTS

| 5,196,905 A | 3/1993 | Hahn et al. |
| 5,311,538 A | 5/1994 | Thorland |
| 5,381,436 A | 1/1995 | Nelson et al. |
| 5,386,289 A | 1/1995 | Thorland |
| 5,442,441 A | 8/1995 | Grover et al. |

(Continued)

FOREIGN PATENT DOCUMENTS

| EP | 0320101 | 10/1988 |
| GB | 2185846 | 7/1987 |
| WO | 9926324 | 5/1999 |

OTHER PUBLICATIONS

Electron Microscopy Sciences, 2006: http://emsdiasum.com/microscopy/technical/datasheet/12642-14.aspx.*

(Continued)

*Primary Examiner* — Kara E Geisel
*Assistant Examiner* — Hina F Ayub
(74) *Attorney, Agent, or Firm* — Fogg & Powers LLC (57) ABSTRACT

A ring laser gyroscope comprises a block defining a hermetically sealed cavity for a ring laser formed when a lasing medium disposed within the cavity is excited. A cathode and an anode are attached to the block at two fill positions comprised within the cavity, and exposed to the lasing medium such that the lasing medium is ionized when a high voltage pulse is supplied across cathode and anode. At least two RF electrodes are attached to the block, positioned on opposing sides to generate a capacitive discharge for the purpose of keeping the lasing medium excited. The gyro comprises a matching circuit to tune the frequency of a radio frequency (RF) signal generated by a RF power source before the RF signal is sent to the electrodes. The matching circuit is coupled to the RF electrodes via respective lead wires, and comprises an element matching network.

14 Claims, 6 Drawing Sheets

(56) References Cited

U.S. PATENT DOCUMENTS

| | | |
|---|---|---|
| 5,471,489 A | 11/1995 | Thorland |
| 5,548,602 A | 8/1996 | Podgorski et al. |
| 5,818,591 A | 10/1998 | Albers et al. |
| 5,867,269 A | 2/1999 | Albers et al. |
| 6,310,904 B1 | 10/2001 | Thorland et al. |
| 6,381,436 B1 | 4/2002 | Swift et al. |
| 6,429,938 B1 | 8/2002 | Altmann et al. |
| 6,728,286 B2 | 4/2004 | Thorland et al. |
| 7,330,269 B2 | 2/2008 | Zurn et al. |
| 7,538,882 B2 | 5/2009 | Thorland et al. |
| 7,697,587 B2 | 4/2010 | Backes et al. |
| 2003/0174092 A1* | 9/2003 | Sullivan ............ H01Q 1/243 343/702 |
| 2004/0026436 A1* | 2/2004 | Ely ............ B64D 11/003 220/627 |
| 2005/0088362 A1* | 4/2005 | Lin ............ H01Q 1/28 343/876 |
| 2006/0165146 A1 | 7/2006 | Backes et al. |
| 2009/0165876 A1* | 7/2009 | Atkin ............ B01L 3/502723 137/825 |
| 2009/0303106 A1* | 12/2009 | Edvardsson ............ G01F 23/284 342/124 |
| 2014/0227981 A1* | 8/2014 | Pecen ............ H01Q 1/52 455/77 |
| 2015/0116153 A1* | 4/2015 | Chen ............ H01Q 5/22 342/359 |

OTHER PUBLICATIONS

European Patent Office, "Extended European Search Report from EP application No. 16150503.7 mailed Jun. 27, 2016", "from Foreign Counterpart U.S. Appl. No. 14/597,971", Jun. 27, 2016, pp. 19, Published in: EP.

Smith, "A Waveguide Gas Laser", Jan. 1, 1971, pp. 132-134, vol. 19, No. 5, Publisher: Applied Physics Letters.

* cited by examiner

RADIO FREQUENCY RING LASER GYROSCOPE INCLUDING A MULTIPLE ELECTRODE SYSTEM AND AN IMPEDANCE MATCHING CIRCUIT

BACKGROUND

Ring laser gyroscopes are used to detect rotation by energizing a lasing medium to create a discharge forming the ring laser. The fringe patterns formed by the ring laser can be used to determine the rotation of the device.

In some conventional ring laser gyroscopes, a direct current (DC) voltage is placed between a cathode and an anode to excite the lasing medium and form the ring laser. The cathode, however, attached to laser cavity within a block of the gyroscope, can absorb the lasing medium, which decreases the life of the ring laser gyroscope. In other ring laser gyroscopes, a radio frequency signal can be used to create a discharge in the ring laser gyroscope and excite the lasing medium. Such a radio frequency gyroscope can improve life and performance of the gyroscope.

SUMMARY

In one embodiment, a ring laser gyroscope comprises a block defining a hermetically sealed cavity for a ring laser, the ring laser formed when a lasing medium disposed within the hermetically sealed cavity is excited. The hermetically sealed cavity includes at least two fill positions. At least two RF electrodes are attached to the block, and the RF electrodes are positioned on opposing sides to generate a capacitive discharge for the purpose of keeping the lasing medium excited. A cathode and an anode are attached to the block at the at least two fill positions, and the cathode and the anode are exposed to the hermetically sealed cavity and the lasing medium disposed within the hermetically sealed cavity such that the lasing medium is ionized when a high voltage pulse is supplied to the cathode and the anode. The ring laser gyroscope also comprises a matching circuit to tune the frequency of a radio frequency (RF) signal generated by a RF power source before the RF signal is sent to the at least two RF electrodes. The matching circuit is coupled to the at least two RF electrodes via respective lead wires, and further comprises and element matching network to tune the RF signal.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4b is top view of the reverse side of the example of the impedance matching circuit of FIG. 4a.

In accordance with common practice, the various described features are not drawn to scale but are drawn to emphasize specific features relevant to the exemplary embodiments.

DETAILED DESCRIPTION

Some embodiments of the ring laser gyroscopes described herein include a radio frequency (RF) gyroscope having a block and a matching circuit coupled to the block. The embodiments described herein can increase life of the ring laser gyroscope and gain improved performance over non-RF ring laser gyroscope systems. The embodiments can also reduce cost of manufacturing and operating ring laser gyroscopes. Some implementations of the RF gyroscope can also include a dual electrode system within the block. The dual electrode system along with an anode and a cathode to kick start the gyroscope provides a reliable discharge startup and leads to effective thermal management.

Figure 1:
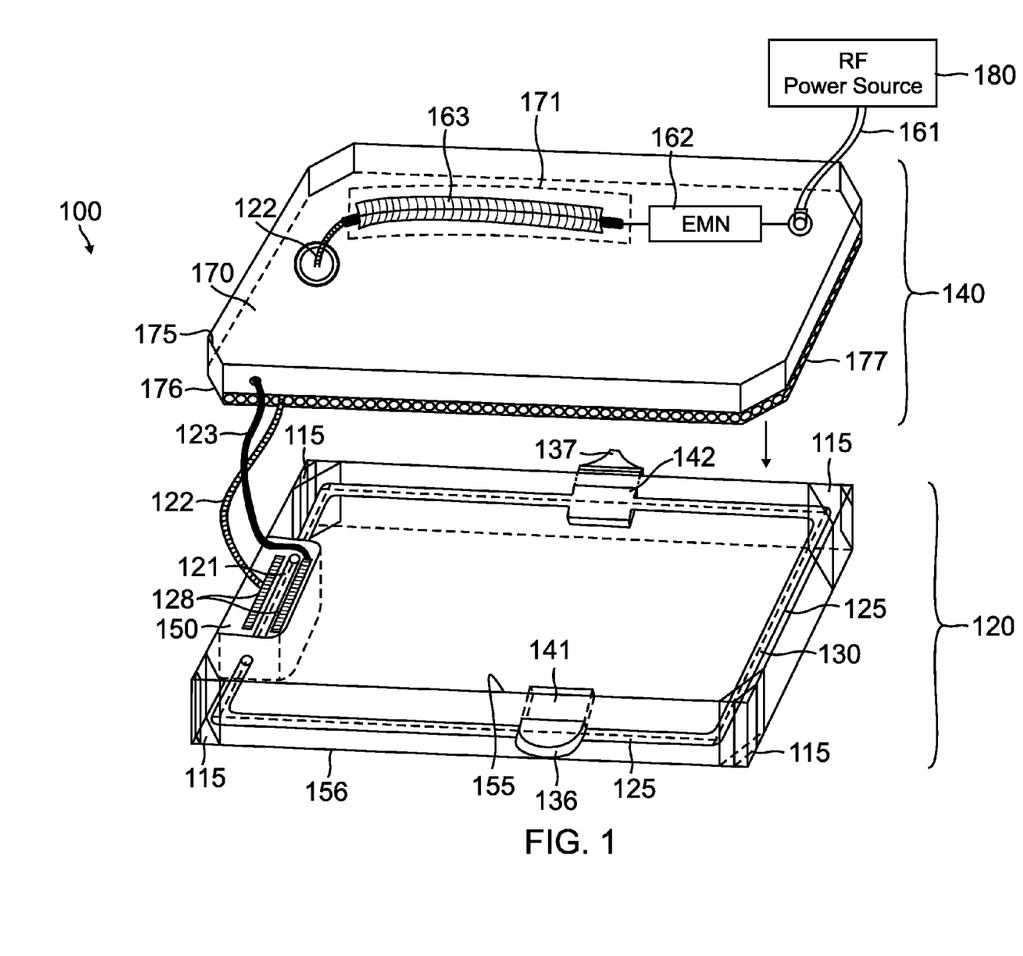
FIG. 1 is an exemplary embodiment of a ring laser gyroscope.

FIG. 1 is an exploded view of one embodiment of a ring laser gyroscope (RLG) 100. RLG 100 includes a block 120, an impedance matching component 140, a radio frequency (RF) power source 180 and lead wires 122 and 123 that couple the impedance matching component 140 to RF electrodes attached to block 120. Block 120 has a generally planar structure defining a first main side 155 and a second main side 156 that is reverse of the first main side 155. The first main side 155 and second main side 156 are parallel to each other. In one implementation of this embodiment, block 120 is composed of glass. In other implementations of this embodiment, block 120 is composed of ceramic or other similar material. In the example shown in FIG. 1, block 120 further has one or more edges defining the sides between the first main side 155 and the second main side 156. Specifically, the example shown in FIG. 1 has four edges and four vertices. However, in another implementation of this embodiment, block 120 has three edges and three vertices. In yet another implementation of this embodiment, block 120 has more than four edges and vertices. In still another implementation of this embodiment, block 120 has no vertices and is circular in shape.

Block 120 further defines a hermetically sealed cavity 125 for a ring laser 130 such that the plane of the ring laser 130 is parallel to the first main side 155 and the second main side 156. Ring laser 130 is composed of a first laser beam and a second laser beam generated when a lasing medium disposed within the hermetically sealed cavity 125 is excited. The first laser beam and the second laser beam propagate along the hermetically sealed cavity 125 in opposite directions and generate fringe patterns indicative of rotational direction of RLG 100. The hermetically sealed cavity includes at least two fill positions 141 and 142 to accommodate a cathode 136 and an anode 137 that connect to the lasing medium disposed inside the hermetically sealed cavity. In one implementation of this embodiment, direct current (DC) voltage is sent across cathode 136 and anode 137 to ionize the lasing medium and kick start the ring laser gyroscope. Cathode 136 and anode 137 placed at fill positions 141 and 142 are given a high voltage pulse to start excitation of the lasing medium in the discharge region. Once the laser beams are on, the voltage source across the cathode 136 and the anode 137 is shut off and the pulse is discontinued. The RF source maintains the operation of the ring laser gyroscope from thereon. In another implementation of this embodiment, a pulse supplied to the anode alone is sufficient to kick start the ring laser gyroscope and excite the lasing medium in the discharge region.

At least three reflective surfaces are included in block 120. In the example shown in FIG. 1, block 120 comprises four reflective surfaces 115. The four reflective surfaces 115 are located at the four vertices of block 120. The first laser beam and the second laser beam travel through the hermetically sealed cavity 125 and reflect from the reflective surface 115 to continue traveling along the next portion of the hermetically sealed cavity 125. At least one of the reflective surfaces 115 also has transmittance. The fringe patterns generated by the interference of the first laser beam and the second laser beam can be detected external to the hermetically sealed cavity via the reflective surface that has transmittance. In one implementation of this embodiment, the lasing medium disposed within the hermetically sealed cavity 125 is a gas mixture. In a further implementation, the gas mixture is composed of Helium and Neon (HeNe). In yet further implementation of this embodiment, the ratio of Helium to Neon is 15:1. In another implementation of this embodiment, the lasing medium is a different gas mixture.

Block 120 also includes an excitation region 150 where the lasing medium is excited. In the example shown in FIG. 1, the excitation region is located along one of the edges of block 120. In one implementation of this embodiment, the excitation region 150 includes a discharge region 121 which is part of the hermetically sealed cavity and contains the lasing medium. At least two RF electrodes 128 are positioned opposite the other on either side of the discharge region. When power is coupled to RF electrodes 128, RF electrodes 128 generate a capacitive discharge for the purpose of exciting the lasing medium within discharge region 121. The excitation region is described in further detail with respect to FIG. 3.

In one implementation of this embodiment, the capacitive discharge is generated by sending a radio frequency (RF) signal to the RF electrodes 128. The RF signal is generated by the RF power source 180, and is tuned to impedance match the RF signal with the RF electrodes 128. To tune the RF signal, the RF source 180 is coupled through a matching component 140 before the signal is sent to the RF electrodes 128.

Matching component 140 is an example of an impedance matching circuit included in RLG 100. The matching component 140 comprises an electrically and thermally conductive sheet 170. In some implementations, sheet 170 facilitates heat dissipation in the ring laser gyroscope. In one implementation of this embodiment, the electrically and thermally conductive sheet is the structural component of the matching component 140. In one implementation of this embodiment, the electrically and thermally conductive sheet is composed of metal. In a further implementation, the metal sheet is composed of copper. In the example shown in FIG. 1, sheet 170 has an outer surface 175 and an inner surface 176 reverse of the outer surface 175. In one implementation of this embodiment, metal sheet 170 is composed of copper.

The matching component 140 further comprises an interconnect cable 161, and element matching network (EMN) 162 and a transmission line 162. As shown in FIG. 1, in one implementation of this embodiment, the interconnect cable 161, the element matching network (EMN) 162 and the transmission line 163 are mounted on outer surface 175 of sheet 170. In one implementation of this embodiment, EMN 162 includes at least one electrical reactance component such as a capacitor or an inductor. In one implementation of this embodiment, interconnect cable 161 is a coaxial cable with interconnect. Interconnect cable 161 is coupled to an RF power source 180. Interconnect cable 161 is also coupled to EMN 162. After going through the interconnect cable 161, the RF signal generated by RF power source 180 goes through EMN 162 and transmission line 163 before being coupled to one of the RF electrodes 128 via a lead wire 122. The other electrode is coupled to a matching electrode comprised in the matching circuit via a lead wire 123. In one implementation of this embodiment, the matching electrode is a ground plane. In the example shown in FIG. 1, sheet 170 is the matching electrode coupled to the other electrode. Transmission line 163 further includes a coaxial conductor covered by a shield 171. The configuration (e.g., sizes of capacitors and inductors) of the EMN 162 determines how the signal is tuned and limits the amount of heat that is dissipated. Further, the length of transmission line 163 also controls the tuning of the frequency of the signal before the signal is coupled to RF electrodes 128.

Block 120 is coupled to the matching circuit via RF electrodes 128. In an implementation of this embodiment, matching component 140 is attached to block 120 via material 177, disposed between inner surface 176 of metal sheet 170 and first main side 155 of block 120. In this example, material 177 is disposed on the inner surface 176 of metal sheet 170. Inner surface 176 is attached to first main side 155 of block 120. In one implementation of this embodiment, material 177 is an adhesive. As shown in FIG. 1, in this example, matching component 140 is shaped similar to the design of block 120 to efficiently attach matching component 140 to block 120.

Figure 2:
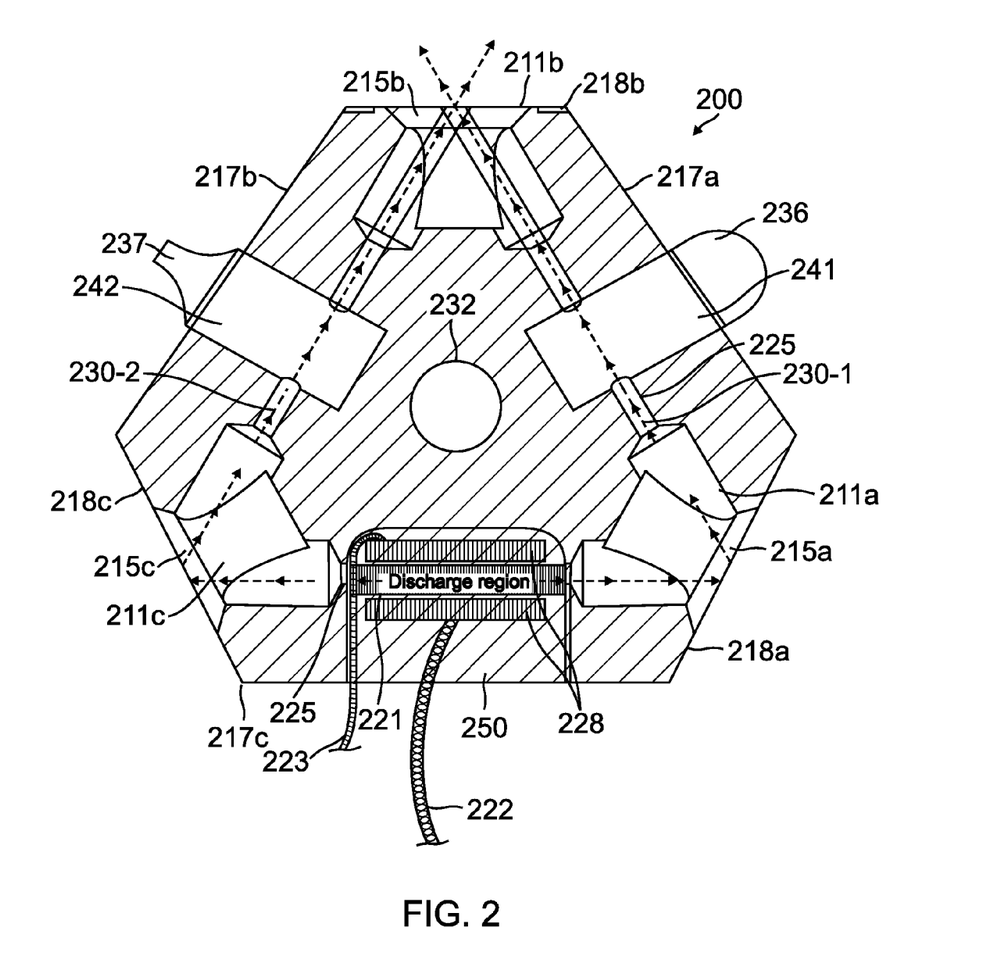
FIG. 2 is a top view of an example of a block comprised in one embodiment of a ring laser gyroscope.

FIG. 2 is a top view of an example of a block 200 comprised in another embodiment of RLG 100. In one implementation of this embodiment, block 200 is composed of glass. In other implementations of this embodiment, block 200 is composed of ceramic or other similar material. Block 200 in FIG. 2 is triangular, and has three edges 217a, 217b and 217c and three vertices 218a, 218b, and 218c. Reflective surfaces 215a, 215b and 215c are located at the three vertices respectively. One of the three reflective surfaces has transmittance to allow detection of fringe patterns generated by wave interference between the first laser beam 230-1 and second laser beam 230-2. Block 200 further includes a hermetically sealed cavity comprising a laser path cavity 225, butterfly regions 211a, 211b and 211c, and two fill positions 241 and 242 to accommodate a cathode 236 and an anode 237. A lasing medium is disposed within block 200 that forms a ring laser when excited.

As shown in FIG. 2, the two fill positions 241 and 242 connect to laser path cavity 225 on either side. In the example shown in FIG. 2, fill positions 241 and 242 comprise a cylindrical cavity to connect cathode 236 and anode 237 to the lasing medium. In other implementations, the cavity in fill positions 241 and 242 can be rectangular or of a different shape. In one implementation of this embodiment, if the ring laser gyroscope does not start operating via radio frequency (RF) power, a direct current (DC) voltage is sent across cathode 236 and anode 237 to kick start the ring laser gyroscope. Cathode 236 and anode 237 placed at fill positions 241 and 242 are given a pulse to start excitation of the lasing medium in the discharge region. However, once the laser beams are on, the pulse is discontinued, and the RF source maintains the operation of the ring laser gyroscope from thereon. In another implementation of this embodiment, a pulse supplied to anode 237 alone is sufficient to kick start the ring laser gyroscope and excite the lasing medium in the discharge region.

Discharge region 221 is a section of laser path cavity 225 where the lasing medium is excited. As shown in FIG. 2, butterfly regions 211a, 211b, and 211c are located in front of reflective surfaces 215a, 215b and 215c. Further, in one implementation of this embodiment, butterfly regions 211a, 211b, and 211c comprise a trapezoidal shaped cavity as shown in the example in FIG. 2. The butterfly regions are connected to laser path cavity 225 on both ends. In the example shown in FIG. 2, the laser path cavity 225 comprising discharge region 221, the butterfly regions 211a, 211b and 211c, and the fill positions 241 and 242 define the hermetically sealed cavity in block 200 for the lasing medium to propagate.

The lasing medium disposed in block 200 is excited in the discharge region 221. Discharge region 221 is included in the excitation region 250. Excitation region 250 has a top electrode region and a bottom electrode region recessed within the block on opposite sides of the discharge region 221 to accommodate at least two RF electrodes 228. Each electrode region accommodates at least one of the at least two RF electrodes 228. RF electrodes 228 are attached to the block on either side of the discharge region 221 within their respective electrode regions. In one implementation of this embodiment, RF electrodes 228 are attached by bonding them to the block. In another implementation of this embodiment, RF electrodes 228 are attached by fritting them to the block. In such an implementation, RF electrodes 228 are fritted to the block using a low transition temperature glass to attach. In yet another implementation of this embodiment, RF electrodes 228 are attached to the block by other compressive means.

Figure 3:
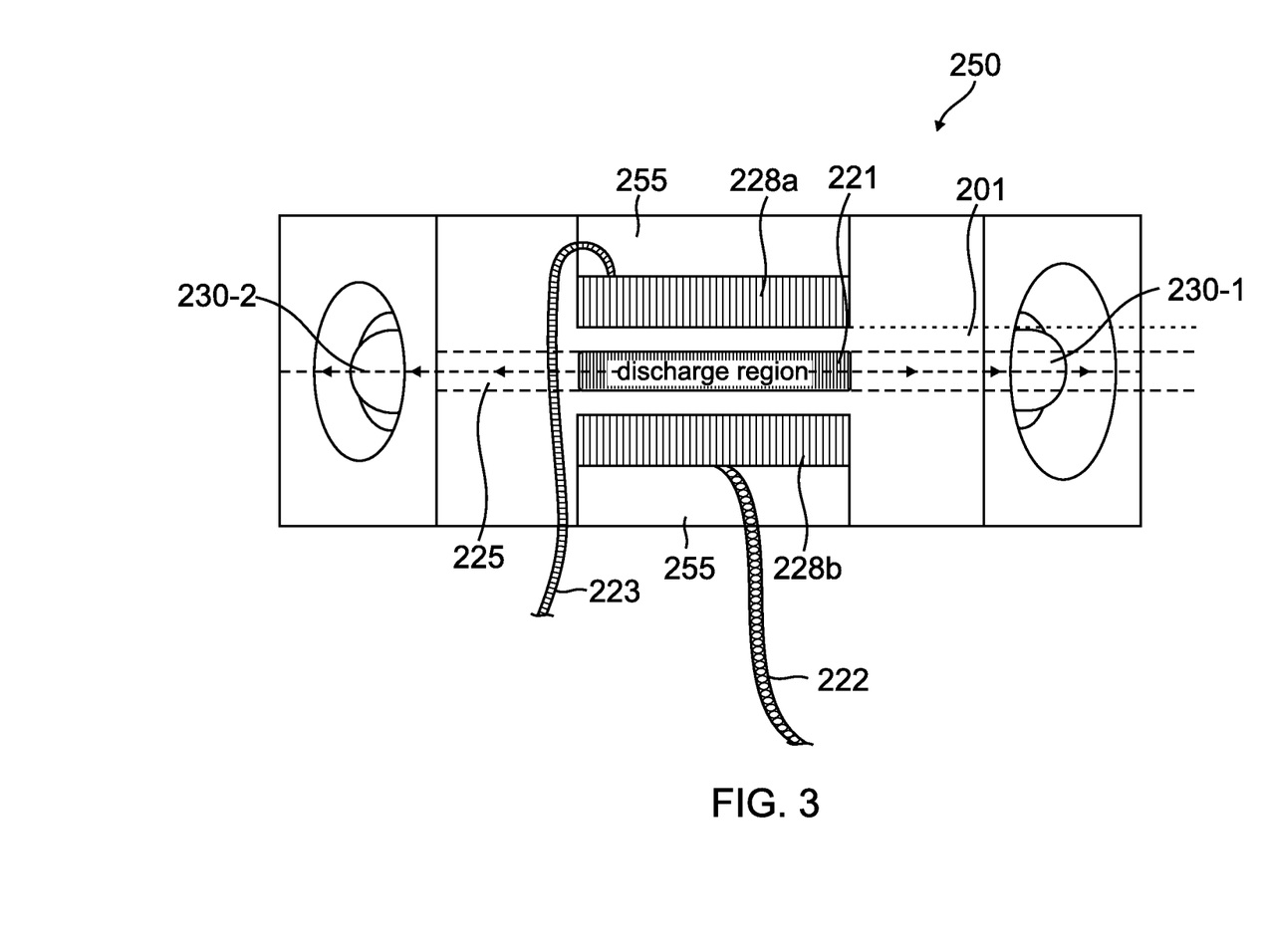
FIG. 3 is cross-sectional view of an example of an excitation region included in a block of a ring laser gyroscope.

FIG. 3 is an example of excitation region 250 included in block 200 shown in FIG. 2. As shown in FIG. 3, block 200 has been recessed and recession regions 255 on opposite side of the discharge region 221 are able to accommodate RF electrodes 228. In one implementation of this embodiment, recession regions 255 are planar portions and each recession region 255 accommodates at least one electrode. In one implementation of this embodiment, RF electrodes 228 are conformal with the block material such that there are no air gaps between the RF electrodes and the block when attached. In such an implementation of this embodiment, RF electrodes 228 are composed of any conformal conductive material. In one example of this embodiment, RF electrodes 228 are composed of silver epoxy. The silver epoxy allows the RF electrodes to be attached to the block without containing air gaps. In another example of this embodiment, RF electrodes 228 are composed of copper epoxy. In yet another example of this embodiment, RF electrodes 228 are composed of silver or other electrically conductive low transition temperature glass fritting material. In still another example of this embodiment, RF electrodes 228 are composed of any other electrically conductive material. In one implementation of this embodiment, the width of RF electrodes 228 is the same size as the bore diameter of discharge region 221.

In the exemplary embodiment shown in FIG. 3, two RF electrodes 228a and 228b are attached to the block on opposite sides. In another example of this embodiment, more than two RF electrodes can be attached to the block. As shown in FIG. 3, RF electrodes 228a and 228b are external to the block separated from the discharge region by block material 201. In one implementation of this embodiment, the width of the block material region 201 between the discharge region 221 and RF electrodes 228 is smaller than the bore diameter. In the example embodiment of FIG. 3, electrode 228b is coupled with a matching electrode comprised on the matching circuit through lead wire 223. In one implementation of this embodiment, the matching electrode is a ground plane. When power is sent into the other electrode 228a through lead wire 222, RF electrodes 228a and 228b generate a capacitive discharge and excite the lasing medium in the discharge region 221.

Turning back to FIG. 2, when the RF electrodes are charged, the lasing medium in the discharge region 221 is excited and generates two laser beams in opposite directions. In the example shown in FIG. 2, first laser beam 230-1 travels counter clockwise and second laser beam 230-2 travels clockwise. The wave interference of first laser beam 230-1 and second laser beam 230-2 generates a fringe pattern, which is detected external to block 200 through the reflective surface that has transmittance. In one implementation of this embodiment, reflective surface 215b located opposite the discharge region 221 has transmittance.

Figure 4A:
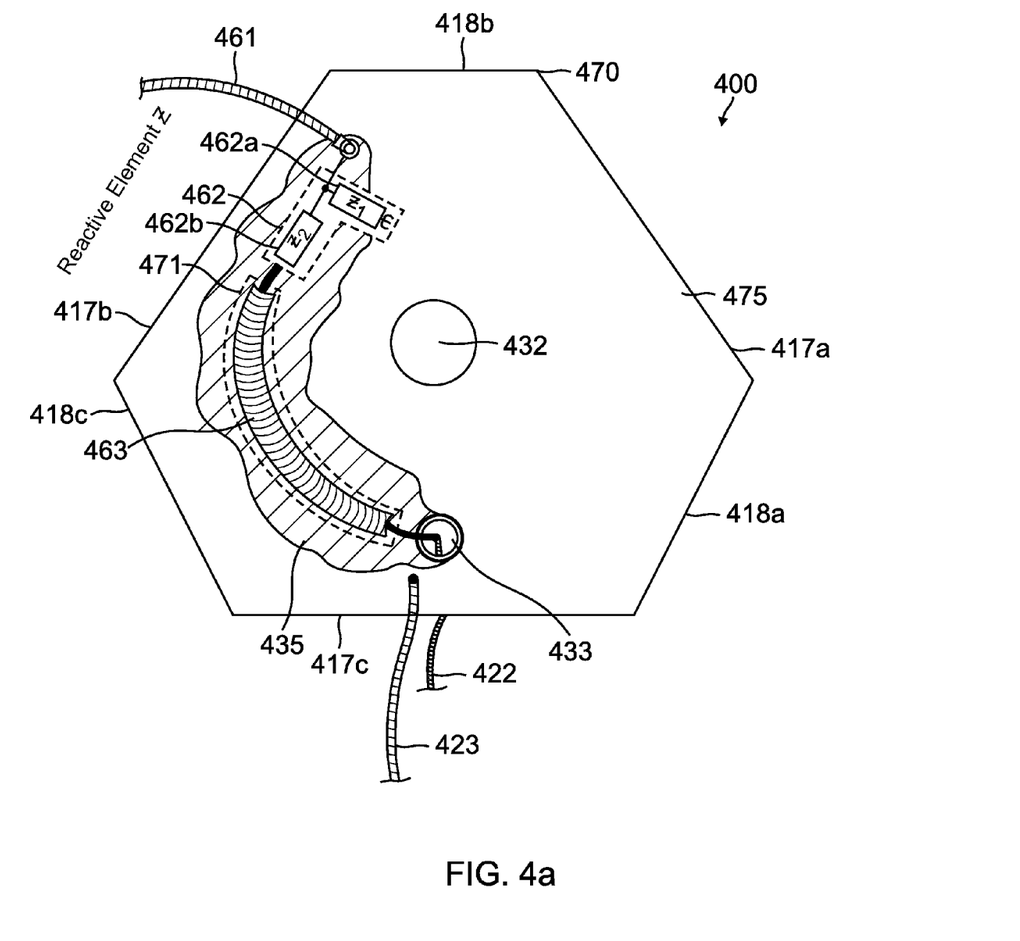
FIG. 4a is top view of an example of an impedance matching circuit that is attached with an exemplary block comprised in a ring laser gyroscope.
Figure 4B:
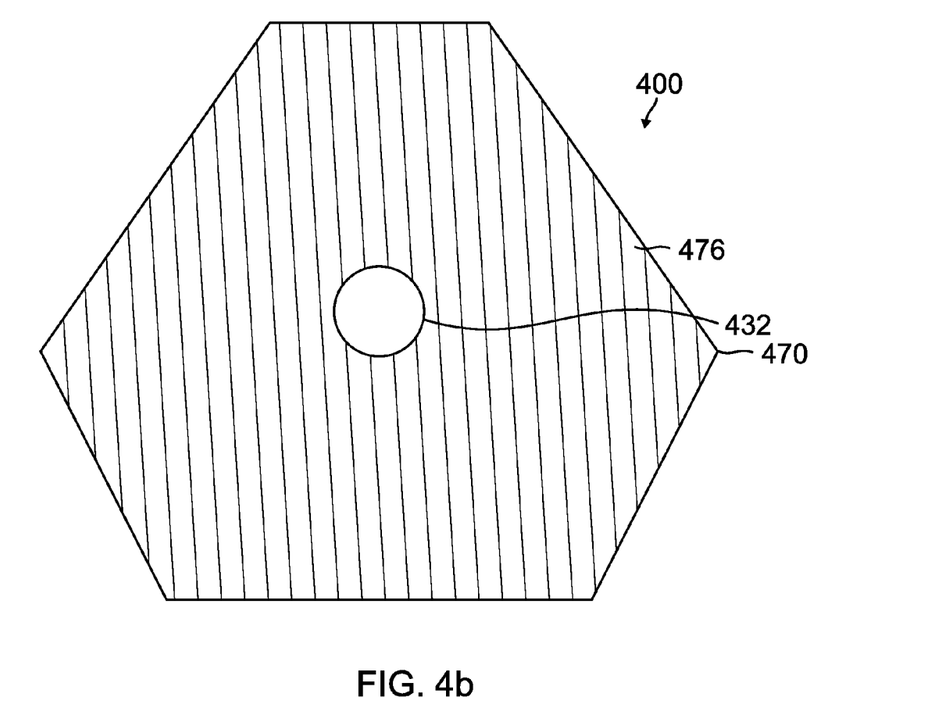

Matching component 400, shown in FIG. 4, is an example of an impedance matching circuit implemented in one embodiment of RLG 100. The impedance matching circuit facilitates the filtering of the RF signal and tuning it to the desired frequency. Matching component 400 comprises an electrically and thermally conductive sheet 470. In one implementation of this embodiment, the electrically and thermally conductive sheet is composed of metal.

In one implementation of this embodiment, the matching component 400 is a matching board that comprises sheet 470. In one implementation of this embodiment, sheet 470 has an outer surface 475 and an inner surface 476. FIG. 4a shows top view of the outer surface 475 and the elements that may be mounted on to outer surface 475. FIG. 4b shows the reverse side of the example of the impedance matching component of FIG. 4a, the inner surface 476. In one implementation of this embodiment, impedance matching component 400 described in FIGS. 4a and 4b is attached to block 200 shown in FIG. 2. In one such implementation, inner surface 476 of the matching component 400 is attached to one main side of block 200 such that edges 417a, 417b, and 417c correspond to edges 217a, 217b and 217c of block 200 respectively, and vertices 418a, 418b and 418c correspond to vertices 218a, 218b, and 218c of block 200 respectively. Such alignment of the edges and vertices is advantageous for procuring a compact design to integrate the ring laser gyroscope within an existing inertial measurement unit.

In one implementation of this embodiment, sheet 470 is composed of copper and acts as a ground plane for the elements mounted on top of metal sheet 470. Elements mounted on outer surface 475 facilitate the dissipation of heat before the signal is coupled to the block comprised in the ring laser gyroscope. In one implementation of this embodiment, the elements are mounted on outer surface 475 using solder 435.

The signal generated by a RF power source is sent into the matching component 400 for tuning before being received by the RF electrodes attached to the block. The matching component 400 comprises an element matching network 462 that assists in tuning the RF signal to the desired frequency. EMN 462 includes one or more reactive elements. In the exemplary embodiment shown in FIG. 4, two reactive elements 462a ($Z_1$) and 462b ($Z_2$) are connected together. In one implementation of this embodiment, EMN 462 is a capacitor. In another implementation of this embodiment, EMN 462 is an inductor. In yet another implementation of this embodiment, EMN 462 includes a capacitor and an inductor that are connected. For example, in one implementation of the embodiment shown in FIG. 4, reactive element 462a is a capacitor, reactive element 462b is an inductor and both are connected to form EMN 462.

In one implementation of this embodiment, the RF signal is sent into the matching circuit via interconnect cable 461. In such an implementation, the interconnect cable 461 is coupled to an element matching network (EMN) 462. In one implementation of this embodiment, interconnect cable 461 is a coaxial cable with interconnect. In one implementation of this embodiment, the matching circuit includes a transmission line 463 that is coupled to EMN 462 and lead wire 422. Transmission line 463 includes a coaxial conductor covered by shield 471. In such an implementation, the RF signal travels through the interconnect cable, EMN 462 and transmission line 463 before it is received by lead wire 422. Lead wire 422 threads the matching circuit through hole 433 and connects it to one of the at least two RF electrodes on the block. A lead wire 423 couples a matching electrode comprised in the matching component 400 with one other of the at least two RF electrodes on the block. In one implementation of this embodiment, the matching electrode is a ground plane. In one implementation of this embodiment, metal sheet 470 is the matching electrode and is coupled with one of the RF electrodes on the block via lead wire 423.

The placement of elements in the matching component 400 affects the tuning of the frequency of the RF signal. In one implementation of this embodiment, the optimal range of frequency is between 100 MHz and 1000 MHz. In a further implementation of this embodiment, the range of frequency is an industrial, scientific and medical (ISM) band of 902 MHz-928 MHz. Both size and placement of EMN 462 and length of the transmission line 463 can affect how the RF signal is tuned. For example, in an implementation of this embodiment where the reactive element 462b is an inductor, spacing of the coil in inductor 462b and its size affect the tuning of the RF signal received; the larger the inductor, the more stabilization in dissipation of heat. The desired length of transmission line 463 also affects the tuning of frequency in the RF signal, and hence the dissipation of heat in the block. Alternatively, in one implementation of this embodiment, the RF signal can be tuned by adjusting the RF power received by the matching circuit via interconnect cable 461.

In one implementation of this embodiment, the ring laser gyroscope further includes a hole drilled through the center. In an implementation of this embodiment, where the ring laser gyroscope includes a block 200 matched with matching component 400, hole 232 is aligned with hole 432. The ring laser gyroscope is screwed to a dither cluster to be fitted into an Inertial Measurement Unit (IMU) assembly. In one implementation of this embodiment, the screw attaching the dither cluster and the ring laser gyroscope creates a proximity for a ground point. In such an implementation, the lasing medium within the block of the ring laser gyroscope is excited by the RF signal supplied by the RF power source alone, and the ring laser gyroscope does not require a kick start from the voltage across the cathode and the anode.

In one implementation of this embodiment, the lasing medium is disposed into the block by connecting the block to a fill station prior to assembling the ring laser gyroscope into the IMU assembly. The lasing medium is disposed into the block via the anode attached to the block at one of the fill positions 241 or 242, and the anode is pinched out once the lasing medium is filled as desired for appropriate tuning required. The pinched portion of the anode is then covered with a sealant to provide a protective cap.

Figure 5:
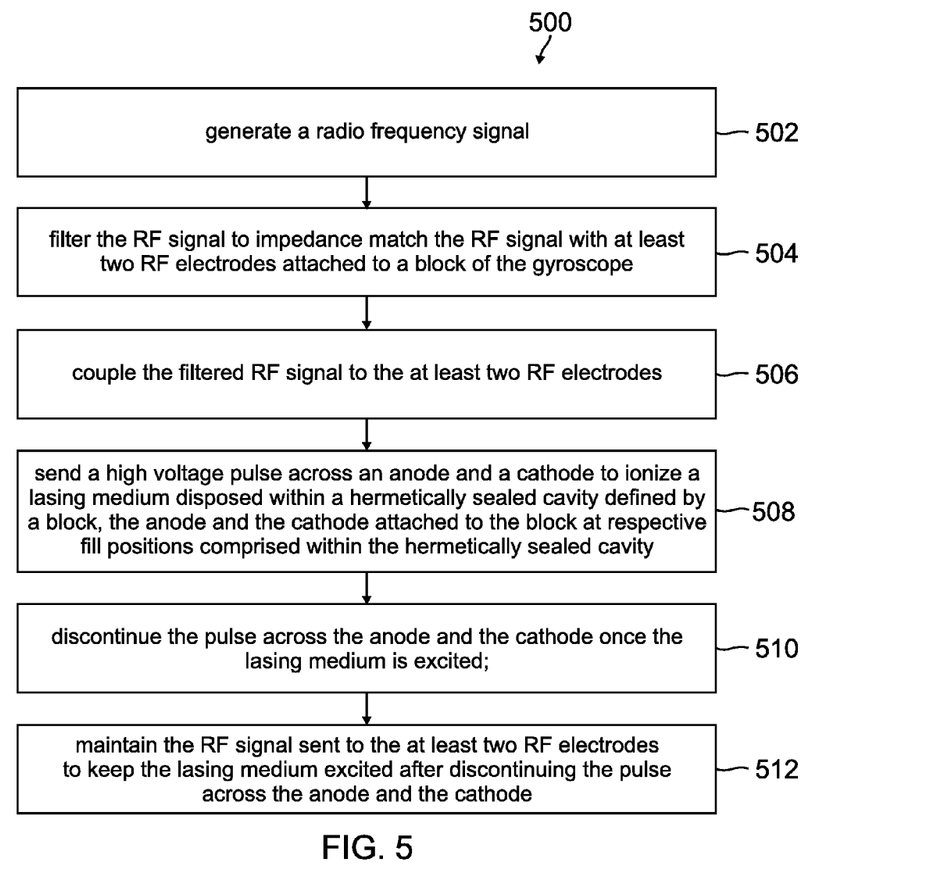
FIG. 5 is an example of a method of manufacturing a ring laser gyroscope, such as the one shown in FIG. 1.

FIG. 5 is a method 500 of operating a ring laser gyroscope, such as the ring laser gyroscope 100 or the ring laser gyroscope implementing the exemplary embodiments described in FIGS. 2 to 4b. At block 502, a radio frequency signal is generated. At block 504, the RF signal is filtered to impedance match the RF signal with at least two RF electrodes attached to a block comprised in the ring laser gyroscope. In one implementation of this method, the optimal range of frequency at which the RF signal is filtered is between 100 MHz and 1000 MHz.

At block 506, the filtered RF signal is coupled to the at least two RF electrodes. At block 508, a high voltage pulse is sent across an anode and a cathode to ionize a lasing medium disposed within a hermetically sealed cavity defined by a block, the anode and the cathode attached at respective fill positions comprised within the hermetically sealed cavity. In one implementation of this method, the cathode and the anode are given a high voltage pulse to ionize the lasing medium and start excitation of the lasing medium in a discharge region of the hermetically sealed cavity. In another implementation of this method, the high voltage pulse supplied to an anode is sufficient to ionize the lasing medium.

At block 510, after the lasing medium is excited the pulse across the anode and the cathode is discontinued. At block 512, after discontinuing the pulse across the anode and the cathode, the RF signal sent to the at least two RF electrodes is maintained to keep the lasing medium excited.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a ring laser gyroscope comprising: a block defining a hermetically sealed cavity for a ring laser, the ring laser formed when a lasing medium disposed within the hermetically sealed cavity is excited, and the hermetically sealed cavity defining at least two fill positions; at least two RF electrodes attached to the block, the RF electrodes positioned on opposing sides to generate a capacitive discharge for the purpose of keeping the lasing medium excited; a cathode and an anode attached to the block, the cathode and the anode exposed to the hermetically sealed cavity and the lasing medium disposed within the hermetically sealed cavity via the two fill positions such that the lasing medium is ionized when a high voltage pulse is supplied to at least the anode; and a matching circuit to tune the frequency of a radio frequency (RF) signal generated by a RF power source before the RF signal is sent to the at least two RF electrodes, the matching circuit coupled to the at least two RF electrodes via respective lead wires, the matching circuit further comprising an element matching network.

Example 2 includes the ring laser gyroscope of example 1, wherein the block further includes two electrode regions, first of the two electrode regions recessed within the block on a first side of a discharge region of the block and second electrode region recessed within the block on the side of the discharge region opposite to the first side of the discharge region, the electrode regions further including a planar portion to accommodate at least one of the at least two RF electrodes.

Example 3 includes the ring laser gyroscope of any of examples 1 or 2, wherein the lasing medium is a helium-neon gas mixture.

Example 4 includes the ring laser gyroscope of any of examples 1-3, wherein the at least two RF electrodes are composed of a conductive material.

Example 5 includes the ring laser gyroscope of any of example 4, wherein the conductive material is silver epoxy.

Example 6 includes the ring laser gyroscope of any of the examples 1-5, wherein the matching circuit further comprises an interconnect cable coupled to the RF power source and the element matching network, and a transmission line comprising a coaxial conductor to couple the at least two electrodes to the element matching network; and wherein the RF signal goes through the interconnect cable, the element matching network and the transmission line before the RF signal is sent into the at least two RF electrodes to excite the lasing medium.

Example 7 includes the ring laser gyroscope of example 6, wherein the matching circuit further comprises an electrically and thermally conductive sheet having an inner side and an outer side, the inner side attached to a first main side of the block via adhesive.

Example 8 includes the ring laser gyroscope of example 7, wherein the element matching network, the interconnect cable and the transmission line are mounted on to the outer side of the electrically and thermally conductive sheet Example 9 includes the ring laser gyroscope of examples 7 or 8, wherein the electrically and thermally conductive sheet is composed of copper.

Example 10 includes the ring laser gyroscope of any of examples 1-9, wherein the element matching network includes a capacitor.

Example 11 includes the ring laser gyroscope of any of examples 1-10, wherein the element matching network includes an inductor.

Example 12 includes the ring laser gyroscope of any of examples 1-11, wherein the width size of the at least two electrodes is same size as bore diameter of the hermetically sealed cavity.

Example 13 includes the ring laser gyroscope of any of examples 1-12, wherein the RF signal is tuned within a frequency range of 100 MHz to 1000 MHz.

Example 14 includes the ring laser gyroscope of any of examples 1-13, wherein the at least two electrodes are conformally bonded to the block such that there are no air gaps between the electrodes and the block when attached.

Example 15 includes a method of operating a ring laser gyroscope, the method comprising: generating a radio frequency (RF) signal; filtering the RF signal to impedance match the RF signal with at least two RF electrodes attached to a block; coupling the filtered RF signal to the at least two RF electrodes; sending a high voltage pulse across an anode and a cathode to ionize a lasing medium disposed within a hermetically sealed cavity defined by a block, the anode and the cathode attached at respective fill positions comprised within the hermetically sealed cavity; discontinuing the pulse across the anode and the cathode once the lasing medium is excited; and maintaining the RF signal sent to the at least two RF electrodes to keep the lasing medium excited after discontinuing the pulse across the anode and the cathode.

Example 16 includes the method of any of example 15, wherein filtering the RF signal further comprises tuning the RF signal within the frequency range of 100 MHz to 1000 MHz.

Example 17 includes the method of any of the examples 15 or 16, wherein filtering the RF signal further comprises sending the RF signal through an interconnect cable, an element matching network and a transmission line before the RF signal is coupled with the at least two RF electrodes.

Example 18 includes the method of any of examples 15-17, wherein sending a high voltage pulse across the anode and the cathode further comprises supplying a pulse only to the anode.

Example 19 includes a ring laser gyroscope comprising: a triangular block defining a hermetically sealed cavity for a ring laser, the triangular block having a first main side and a second main side, the second main side reverse of the first main side, and the first main side and the second main side parallel to the plane formed by the ring laser; a lasing medium disposed within the hermetically sealed cavity, the lasing medium forming a first laser beam and a second laser beam that propagate along the hermetically sealed cavity within the triangular block in opposite directions and generate fringe patterns indicative of rotational direction of the ring laser gyroscope; an impedance matching board composed of a copper sheet having an outer surface and an inner surface, wherein the inner surface of the copper sheet is attached to the triangular block, and wherein at least one capacitor, at least one inductor, a transmission line comprising a coaxial conductor with a shield, and an interconnect cable to feed in radio frequency (RF) power are soldered on to an outer surface of the copper sheet; two electrodes attached to the triangular block along one of its three edges separated by a discharge region within the waveguide where the lasing medium is excited, the two electrodes positioned opposite each other to generate a capacitive discharge for purpose of exciting the lasing medium; a first lead wire that connects the impedance matching board to first of the two electrodes; and a second lead wire that connects the impedance matching board to the second of the two electrodes.

Example 20 includes the ring laser gyroscope of example 19, wherein width of the two electrodes is the same size as bore diameter of the discharge region.

What is claimed is:

1. A ring laser gyroscope comprising:
    a block defining a hermetically sealed cavity for a ring laser, the ring laser formed when a lasing medium disposed within the hermetically sealed cavity is excited, and the hermetically sealed cavity defining at least two fill positions;
    at least two RF electrodes attached to the block, the RF electrodes positioned on opposing sides of a discharge region to generate a capacitive discharge for the purpose of keeping the lasing medium excited, wherein the discharge region is a section within the hermetically sealed cavity where the lasing medium is excited;
    a cathode and an anode attached to the block, the cathode and the anode exposed to the hermetically sealed cavity and the lasing medium disposed within the hermetically sealed cavity via the two fill positions such that the lasing medium is ionized when a high voltage pulse is supplied to at least the anode; and
    a matching circuit to tune the frequency of a radio frequency (RF) signal generated by a RF power source before the RF signal is sent to the at least two RF electrodes, the matching circuit coupled to the at least two RF electrodes via respective lead wires, the matching circuit further comprising an element matching network;
    wherein the RF power source is configured to maintain the RF signal sent to the at least two RF electrodes to keep the lasing medium excited after the high voltage pulse across the anode and the cathode is discontinued.

2. The ring laser gyroscope of claim 1, wherein the block further includes two electrode regions, a first of the two electrode regions recessed within the block on a first side of the discharge region of the block and a second electrode region recessed within the block on the side of the discharge region opposite to the first side of the discharge region, the electrode regions further including a planar portion to accommodate at least one of the at least two RF electrodes.

3. The ring laser gyroscope of claim 1, wherein the lasing medium is a helium-neon gas mixture.

4. The ring laser gyroscope of claim 1, wherein the at least two RF electrodes are composed of a conductive material.

5. The ring laser gyroscope of claim 4, wherein the conductive material is silver epoxy.

6. The ring laser gyroscope of claim 1, wherein the matching circuit further comprises an interconnect cable coupled to the RF power source and the element matching network, and a transmission line comprising a coaxial conductor to couple the at least two electrodes to the element matching network; and wherein the RF signal goes through the interconnect cable, the element matching network and the transmission line before the RF signal is sent into the at least two RF electrodes to excite the lasing medium.

7. The ring laser gyroscope of claim 6, wherein the matching circuit further comprises an electrically and thermally conductive sheet having an inner side and an outer side, the inner side attached to a first main side of the block via adhesive.

8. The ring laser gyroscope of claim 7, wherein the element matching network, the interconnect cable and the transmission line are mounted on to the outer side of the electrically and thermally conductive sheet.

9. The ring laser gyroscope of claim 7, wherein the electrically and thermally conductive sheet is composed of copper.

10. The ring laser gyroscope of claim 1, wherein the element matching network includes a capacitor.

11. The ring laser gyroscope of claim 1, wherein the element matching network includes an inductor.

12. The ring laser gyroscope of claim 1, wherein the width size of the at least two electrodes is same size as bore diameter of the hermetically sealed cavity.

13. The ring laser gyroscope of claim 1, wherein the RF signal is tuned within a frequency range of 100 MHz to 1000 MHz.

14. The ring laser gyroscope of claim 1, wherein the at least two RF electrodes are conformally bonded to the block such that there are no air gaps between the electrodes and the block when attached.

\* \* \* \* \*